US012380795B2

(12) United States Patent
Shannon et al.

(10) Patent No.: US 12,380,795 B2
(45) Date of Patent: Aug. 5, 2025

(54) SAFETY CIRCUIT, DEVICE AND METHOD

(71) Applicant: 3M INNOVATIVE PROPERTIES COMPANY, St. Paul, MN (US)

(72) Inventors: Matthew Shannon, Salisbury, NC (US); Wesley M. Barbee, Oxboro, NC (US); Craig M. Parkulo, Midland, NC (US); Ronnie G. Durham, Monroe, NC (US); Michael R. Oliva, Fair Oaks Ranch, TX (US); Paul M. Rathke, Swannanoa, NC (US); Brian Minier, Raleigh, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/043,924

(22) PCT Filed: Aug. 30, 2021

(86) PCT No.: PCT/IB2021/057917
§ 371 (c)(1),
(2) Date: Mar. 3, 2023

(87) PCT Pub. No.: WO2022/058825
PCT Pub. Date: Mar. 24, 2022

(65) Prior Publication Data

US 2023/0326326 A1 Oct. 12, 2023

Related U.S. Application Data

(60) Provisional application No. 63/080,058, filed on Sep. 18, 2020.

(51) Int. Cl.
*G08B 25/01* (2006.01)
*G08B 21/04* (2006.01)

(52) U.S. Cl.
CPC ....... *G08B 25/016* (2013.01); *G08B 21/0438* (2013.01)

(58) Field of Classification Search
CPC .......................... G08B 25/016; G08B 21/0438
(Continued)

(56) References Cited

U.S. PATENT DOCUMENTS 5,541,579 A * 7/1996 Kiernan ............ G08B 21/0453 200/51.09
6,016,099 A 1/2000 Campman
(Continued)

OTHER PUBLICATIONS

International Search Report for PCT Application No. PCT/IB2021/057917, mailed on Dec. 1, 2021, 4 pages.

*Primary Examiner* — Naomi J Small
(74) *Attorney, Agent, or Firm* — Jonathan V. Sry

(57) ABSTRACT

A safety circuit for a Personal Alert Safety System (PASS) device includes a safety logic circuit and an alarm circuit. The safety logic circuit is communicably coupled to the PASS device. The safety logic circuit includes a timer configured to determine a time elapsed since the timer has been last reset. The safety logic circuit is configured to switch from an off state to an on state upon receiving an activation signal from the PASS device and reset the timer upon switching to the on state, generate a trigger signal in response to the timer exceeding a time threshold, and reset the timer upon receiving a reset signal from the PASS device before the timer exceeds the time threshold. The alarm circuit is communicably coupled to the safety logic circuit and configured to generate an alarm signal upon receiving the trigger signal from the safety logic circuit.

20 Claims, 10 Drawing Sheets

(58) Field of Classification Search
USPC .......................................................... 340/573.1
See application file for complete search history.

(56) References Cited

U.S. PATENT DOCUMENTS

| | | | | | |
|---|---|---|---|---|---|
| 6,995,665 | B2 * | 2/2006 | Appelt | G08B 21/02 | 128/204.23 |
| 7,178,931 | B1 * | 2/2007 | Murphy | A62B 18/08 | 362/105 |
| 2003/0231115 | A1 * | 12/2003 | Stanners | G08B 25/012 | 340/539.1 |
| 2006/0035622 | A1 * | 2/2006 | Kampel | G08B 21/0258 | 455/575.1 |
| 2007/0104297 | A1 | 6/2007 | Nelson | | |
| 2008/0284587 | A1 | 11/2008 | Saigh et al. | | |
| 2009/0289763 | A1 * | 11/2009 | Chriss | G08B 25/009 | 340/7.5 |
| 2013/0093587 | A1 | 4/2013 | Gonsalves et al. | | |
| 2013/0113620 | A1 * | 5/2013 | Hogg | A62B 9/006 | 340/539.12 |
| 2014/0266702 | A1 | 9/2014 | Forester-Knight | | |
| 2015/0231421 | A1 * | 8/2015 | Berney-Smith | A62B 9/022 | 128/202.13 |
| 2015/0279187 | A1 * | 10/2015 | Kranz | G08B 21/0415 | 340/539.12 |
| 2016/0173610 | A1 * | 6/2016 | Parkulo | H04W 84/18 | 340/573.1 |
| 2020/0168057 | A1 | 5/2020 | Sloo et al. | | |

* cited by examiner

400

| | 402 | 404 | 406 | 408 | 410 | 412 | 414 | 416 |
|---|---|---|---|---|---|---|---|---|
| 418 | PASS Device | Safety Circuit | PASS Power Source | Circuit Power Source | PASS Logic Circuit | Timer | Safety Logic Circuit | Alarm |
| 420 | OFF | OFF | OFF | OFF | Dormant State | Dormant State | Dormant State | NO |
| 422 | ON | ON | ON | OFF | Generates periodic reset signal | Does not exceed time threshold | Does not generate trigger signal | NO |
| 424 | ON | ON | ON | OFF | Does not generate periodic reset signal | Exceeds time threshold | Generates trigger signal | YES |
| 426 | ON | ON | ON | OFF | Generates emergency signal | Not Applicable | Generates trigger signal | YES |
| 428 | ON | ON | OFF | ON | Not Applicable | Not Applicable | Generates trigger signal | YES |

*FIG. 4*

SAFETY CIRCUIT, DEVICE AND METHOD

TECHNICAL FIELD

The present disclosure relates generally to a safety circuit for a personal alert safety system (PASS) device, a PASS device including the safety circuit, and a method for use with the PASS device.

BACKGROUND

A personal alert safety system (PASS) device, also known as a distress signal unit (DSU) or an automatic distress signal unit (ADSU), is a personal safety device used primarily by emergency services workers, such as firefighters, in a hazardous area, for example, a burning building. The primary purpose of the PASS device is to generate an alarm when an emergency services worker is in danger or distress. The PASS device generates the alarm to notify other emergency workers in the hazardous area where the emergency services worker is in distress. The alarm indicates a true emergency and requires an immediate response to rescue the emergency services worker(s) in distress.

A conventional PASS device may use a sub-circuit to generate the alarm. The PASS device including the sub-circuit may detonate in an explosive atmosphere in the hazardous area. In some cases, the sub-circuit of the PASS device may lose power or even lose contact with the rest of the PASS device, due to damage to the PASS device.

SUMMARY

In a first aspect, the present disclosure provides a safety circuit for a Personal Alert Safety System (PASS) device. The safety circuit includes a safety logic circuit and an alarm circuit. The safety logic circuit is communicably coupled to the PASS device. The safety logic circuit has at least an off state and an on state. The safety logic circuit includes a timer configured to determine a time elapsed since the timer has been last reset. The safety logic circuit is configured to switch from the off state to the on state upon receiving an activation signal from the PASS device. The activation signal is indicative of the switching of the PASS device from a PASS off state to a PASS on state. The safety logic circuit is further configured to reset the timer upon switching to the on state. The safety logic circuit is further configured to generate a trigger signal in response to the timer exceeding a time threshold. The safety logic circuit is further configured to reset the timer upon receiving a reset signal from the PASS device before the timer exceeds the time threshold. The alarm circuit is communicably coupled to the safety logic circuit. The alarm circuit is configured to generate an alarm signal upon receiving the trigger signal from the safety logic circuit.

In a second aspect, the present disclosure provides a PASS device. The PASS device includes a PASS logic circuit and a safety circuit. The PASS logic circuit has at least a PASS on state and a PASS off state. The PASS logic circuit is configured to generate an activation signal upon switching from the PASS off state to the PASS on state, and generate periodically a reset signal in the PASS on state. The safety circuit includes a safety logic circuit and an alarm circuit. The safety logic circuit is communicably coupled to the PASS logic circuit. The safety logic circuit has at least an off state and an on state. The safety logic circuit includes a timer configured to determine a time elapsed since the timer has been last reset. The safety logic circuit is configured to switch from the off state to the on state upon receiving the activation signal from the PASS logic circuit, and reset the timer upon switching to the on state. The safety logic circuit is further configured to generate a trigger signal in response to the timer exceeding a time threshold. The safety logic circuit is further configured to dismiss the trigger signal and reset the timer upon receiving the reset signal from the PASS logic circuit before the timer exceeds the time threshold. The alarm circuit is communicably coupled to the safety logic circuit. The alarm circuit is configured to generate an alarm signal upon receiving the trigger signal from the safety logic circuit.

In a third aspect, the present disclosure provides a method for use with a PASS device. The method includes resetting a timer upon receiving an activation signal from the PASS device. The timer is configured to determine a time elapsed since the timer has been last reset. The activation signal is indicative of the switching of the PASS device from a PASS off state to a PASS on state. The method further includes generating an alarm in response to the timer exceeding a time threshold. The method further includes resetting the timer upon receiving a reset signal from the PASS device before the timer exceeds the time threshold.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 4 shows an exemplary logic table illustrating possible outcomes by the PASS device of the present disclosure;

DETAILED DESCRIPTION

Figure 1:
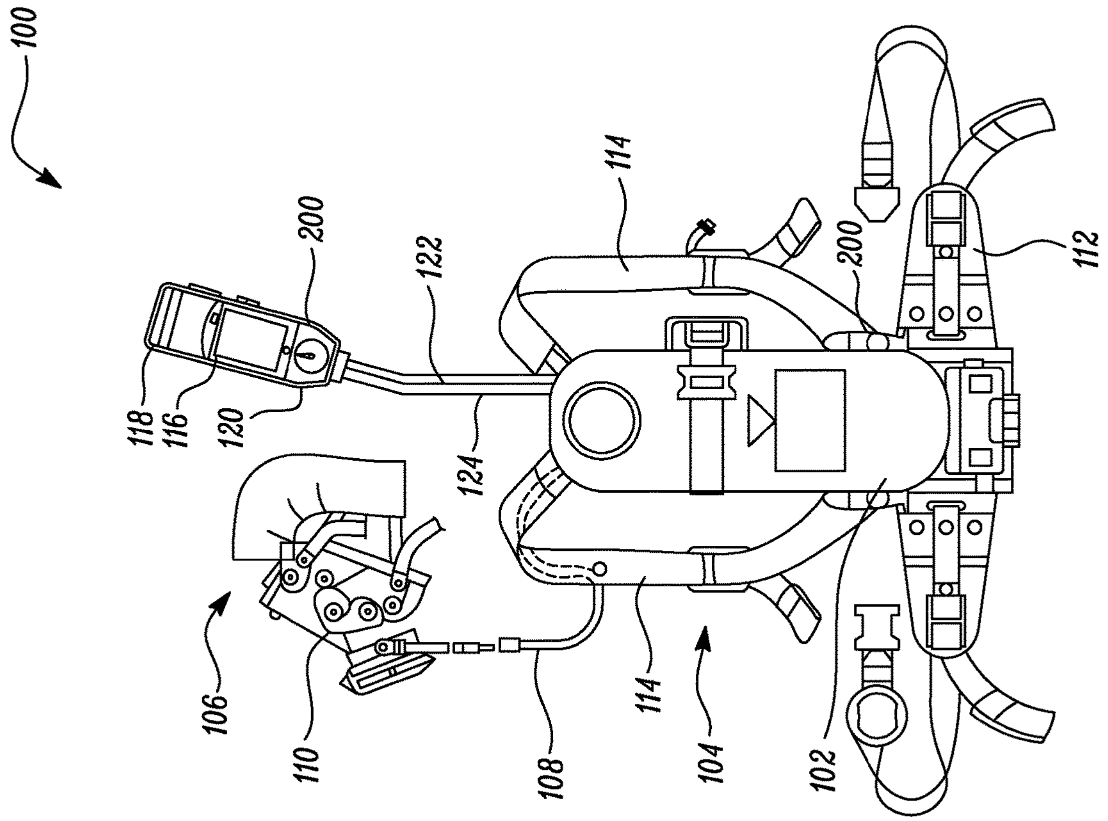
FIG. 1 shows a schematic perspective view of an exemplary mobile emergency system including a Personal Alert Safety System (PASS) device according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

"Logic," as used herein, includes, but is not limited to, hardware, firmware, software and/or combinations of each to perform a function(s), an action(s), and/or to cause a function and/or action from another component. For example, based on a desired application and/or needs, logic can include, but is not limited to, a software-controlled microprocessor, discrete logic such as an application specific integrated circuit (ASIC), and/or other programmed logic device. Logic can also be fully embodied as software; however, this is not required.

"Signal," as used herein, includes, but is not limited to, one or more electrical signals, optical signals, electromagnetic signals, analog and/or digital signals, one or more computer instructions, a bit and/or bit stream, or the like.

The present disclosure provides a safety circuit for a Personal Alert Safety System (PASS) device and a method for use with the PASS device.

A PASS device may be used by fire fighters or other emergency services workers entering a hazardous environment or immediately dangerous to life or health (IDLH) conditions. The hazardous environment may include burning buildings or an environment with exposure to airborne contaminants that may cause death, or immediate/delayed permanent adverse health effects. The PASS device may be used in a mobile emergency system. The PASS device may be used in conjunction with a breathing apparatus. The PASS device is a portable, battery powered device that may be attached to a self-contained breathing apparatus (SCBA) harness which enables the firefighters to summon help by activating a loud, piercing electronic alarm. The PASS device may be used to alert a rescue team or other emergency services workers in the vicinity of an emergency services worker in distress using the alarm. The PASS devices may be applicable to various filter systems or personal protective equipment, such as personal respirators, including powered air purifying respirators (PAPR), reusable personal respirators, disposable personal respirators, hazmat suits, collective protection filters and other applications that will be familiar to those skilled in the art. The PASS device may also be known as a distress signal unit (DSU) or an automatic distress signal unit (ADSU).

The safety circuit for the PASS device includes a safety logic circuit and an alarm circuit communicably coupled to the safety logic circuit. The safety logic circuit is communicably coupled to the PASS device. The safety logic circuit has at least an off state and an on state. The safety logic circuit includes a timer configured to determine a time elapsed since the timer has been last reset. The safety logic circuit is configured to switch from the off state to the on state upon receiving an activation signal from the PASS device. The activation signal is indicative of the switching of the PASS device from a PASS off state to a PASS on state. The safety logic circuit is further configured to reset the timer upon switching to the on state. The safety logic circuit is further configured to generate a trigger signal in response to the timer exceeding a time threshold. The safety logic circuit is further configured to reset the timer upon receiving a reset signal from the PASS device before the timer exceeds the time threshold. The alarm circuit is configured to generate the alarm signal upon receiving the trigger signal from the safety logic circuit.

The PASS device may be vulnerable to thermal damage. A conventional PASS device may include a sub-circuit to generate the alarm. The conventional PASS device including the sub-circuit may detonate in the hazardous area. Specifically, a spark or a hotspot may cause ignition in the hazardous area which may subsequently damage the PASS device or expose the PASS device to excessive heat. In some cases, the sub-circuit of the PASS device may lose power or even lose contact with the rest of the PASS device. The PASS device may also be vulnerable to physical damage. In such cases, the conventional PASS device may be unable to generate an alarm in case of an emergency.

The safety circuit of the present disclosure may be designed in such a manner that the safety circuit has a higher probability of surviving the physical and thermal damage than other components of the PASS device.

Therefore, the safety circuit of the PASS device of the present disclosure may ensure that the PASS device generates the alarm when an emergency worker is in distress. The PASS device may further ensure that the alarm is generated in emergencies which require an immediate response to rescue the emergency worker in distress.

Referring now to figures, FIG. 1 is a perspective view of an exemplary mobile emergency system 100 (herein after referred as "system 100") carried by an emergency services worker (hereinafter referred as "worker"), for example, a firefighter. The system 100 includes a Personal Alert Safety System (PASS) device 200, a personal digital assistant (PDA) device 116, a video camera 118 and a heads-up display (HUD) 110. As illustrated therein, the system 100 may further include a collection of firefighting or safety equipment, including a high-pressure air tank 102 (hereinafter referred as "air tank 102"), mounted on a backpack 104, as well as a headgear 106 that is worn on the worker's head and connected to the air tank 102 by an air supply/data line 108. The air supply/data line 108 supplies breathable air from the air tank 102 to the worker's mouth and nose and power/data communications to the HUD 110. The backpack 104 includes a belt 112 and shoulder straps 114.

The PASS device 200 may include a PASS control console 120. The PASS control console 120 may hang from the end of a pressure data line 122, connected via a pressure reducer to the air tank 102, and a reinforced electronics cable sheath 124 (hereinafter referred as "sheath 124"). The sheath 124 includes an electronics cable that interconnects PASS circuits (not shown in FIG. 1) to the PASS control console 120 and the PDA device 116. In FIG. 1, the PASS device 200 is shown to be distributed at two locations within the system 100, specifically at an end of the pressure data line 122 and at a base of the air tank 102 on the belt 112. In some cases, the PASS circuits, and the PASS control console 120 may be co-located within the system 100.

The HUD 110 is connected to other electronic components via an electronics cable integral with the air supply/data line 108. However, the electronics cable may also be separate from the air supply/data line 108. The HUD 110 displays various information, such as an indication of an amount of air remaining in the air tank 102, instructions/information received from a command gateway (not shown) and/or from other portable devices (not shown). Information of the air tank 102 may be gathered via a pressure transducer located in an outlet pathway of the air tank 102. In some embodiments, the HUD 110 may include multiple LEDs corresponding to the air tank 102 being ¼ full, ½ full, ¾ full and completely full.

Optionally, the PASS device 200 may be interconnected with, or incorporated into, other systems or personal protection equipment (PPE) carried by workers, such as firefighters, soldiers, or other users. For example, workers, such as firefighters, typically carry a breathing apparatus when entering a dangerous environment. There are different types of breathing apparatus, with which the PASS device 200 may be utilized. Examples of such breathing apparatus include a portable air purifying respirator (PAPR), a self-contained breathing apparatus (SCBA), a non-powered air purifying respirator (APR), a hose line, any combination thereof and the like. In some other examples, the PASS device 200 may be incorporated into fall protection equipment. One of the purposes of the PASS device 200 is to generate an alarm when an emergency services worker is in danger or distress.

Figure 2:
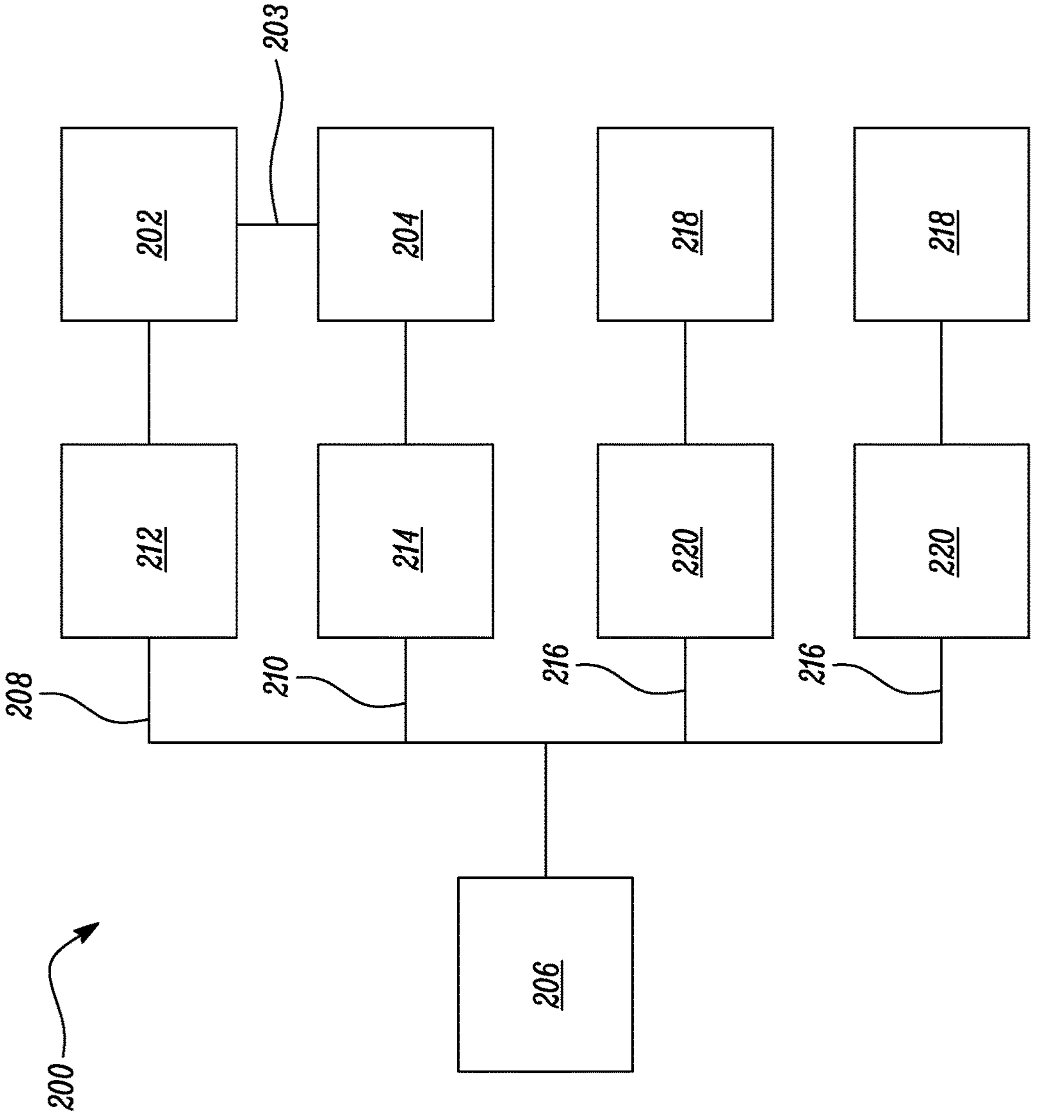
FIG. 2 shows a block diagram of the PASS device of FIG. 1.
Figure 3:
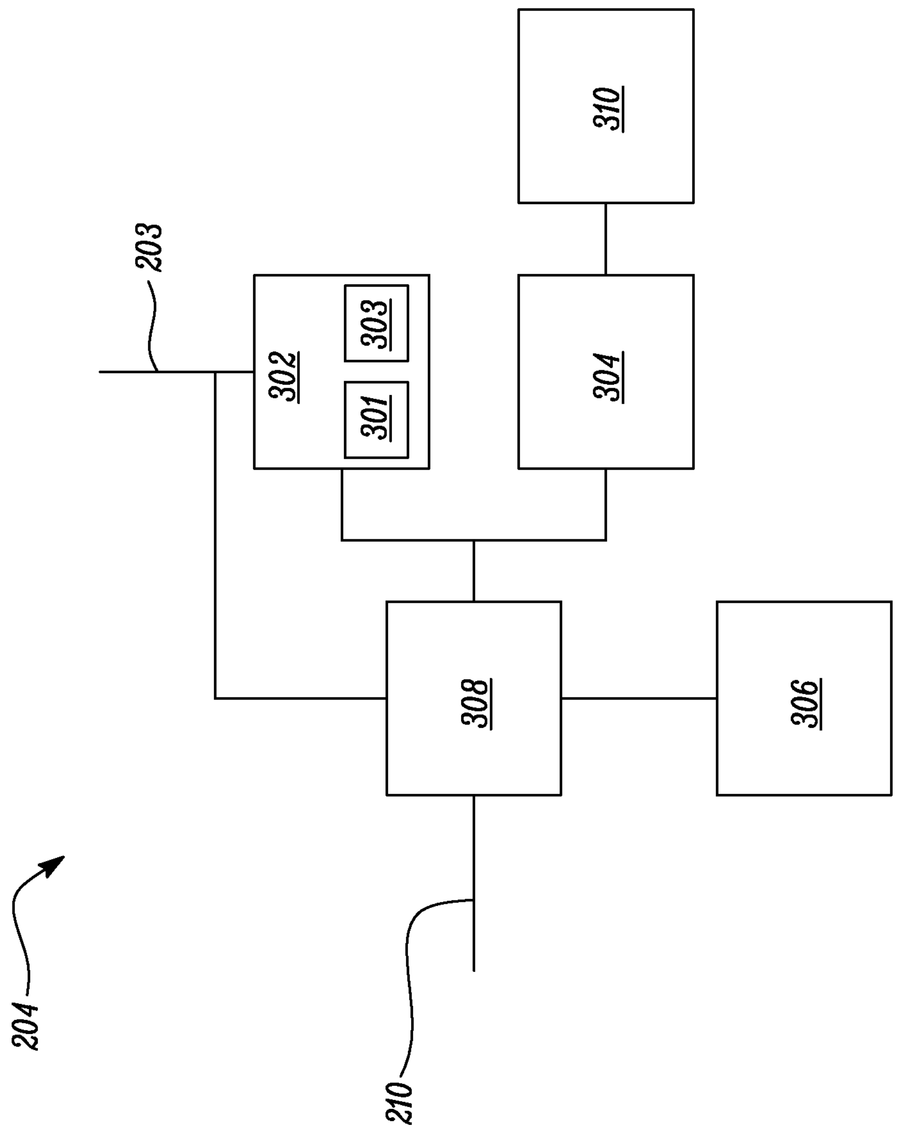
FIG. 3 shows a block diagram of a safety circuit of the PASS device of FIG. 1.
Figure 5:
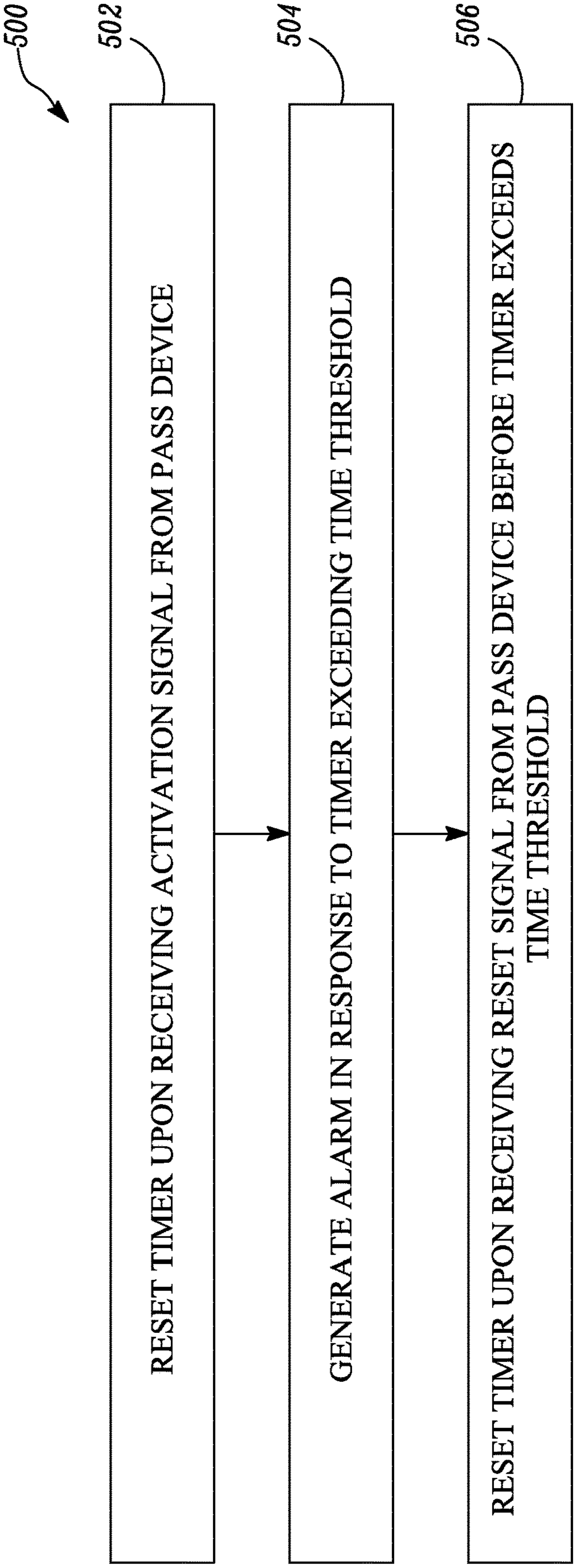
FIG. 5 shows a flowchart generally representing a method for use with the PASS device of the present disclosure.

The PASS device 200 includes multiple circuits and sub-circuits which are illustrated in FIGS. 2 and 3, and explained in detail below.

FIG. 2 is a block diagram illustrating various functional blocks in the PASS device 200 of FIG. 1. The PASS device 200 includes a PASS logic circuit 202, a safety circuit 204, and a PASS power source 206 communicably coupled to the PASS logic circuit 202. In some embodiments, the PASS power source 206 may include electrochemical cells, batteries, battery packs, portable power stations or portable power supplies. In some embodiments, the PASS power source 206 may include replaceable or rechargeable batteries.

The safety circuit 204 is communicably coupled to the PASS logic circuit 202. In the illustrated embodiment of FIG. 2, the safety circuit 204 is communicably coupled to the PASS logic circuit 202 via a communication link 203. In some embodiments, the communication link 203 may be a physical or a virtual communication channel between the safety circuit 204 and the PASS logic circuit 202.

The PASS logic circuit 202 of the PASS device 200 may generates various signals in different states/conditions. The PASS logic circuit 202 has at least a PASS on state and a PASS off state. The PASS logic circuit 202 is configured to generate an activation signal upon switching from the PASS off state to the PASS on state. The activation signal is indicative of the switching of the PASS device 200 from the PASS off state to the PASS on state. In some embodiments, the PASS logic circuit 202 is further configured to generate a deactivation signal upon switching from the PASS on state to the PASS off state. The deactivation signal is indicative of the switching of the PASS device 200 from the PASS on state to the PASS off state. The PASS logic circuit 202 is further configured to generate periodically a reset signal in the PASS on state.

In some embodiments, the PASS logic circuit 202 may further have other states that may be associated with the PASS device 200 to indicate several conditions. These conditions may include, but are not limited to, residual pressure in a breathing gas supply (e.g., above ¾ residual pressure, residual pressure between ¾ and ½, residual pressure between ½ and ¼, residual pressure between ¼ and a predetermined minimum pressure [e.g., 98 psi (0.7 Mega Pascal)], etc.), a low battery condition (e.g., 75% power, 50% power, 25%, power, 10% power, etc.), a loss of a wireless/wired link, a PASS pre-alert condition, a PASS alarm condition, a "motionless" condition, and/or a shutdown. In some embodiments, the PASS device 200 may include a different arrangement of displays, a greater or lesser number of LEDs, etc., different or additional types of LEDs, etc., different or additional colors of LEDs, etc., and/or different patterns of LEDs, etc. that are capable of being selectively illuminated in one or more of multiple colors. In some embodiments, the different colors of LEDs may be used to indicate the different states/conditions of the PASS device 200.

In some embodiments, the PASS device 200 further includes a first branch 208 and a second branch 210. The first branch 208 is electrically connected to the PASS power source 206. Further, the first branch 208 includes the PASS logic circuit 202 and a first barrier circuit 212 disposed between the PASS logic circuit 202 and the PASS power source 206. The second branch 210 is electrically connected to the PASS power source 206 and electrically separated from the first branch 208. The second branch 210 includes the safety circuit 204 and a second barrier circuit 214 disposed between the safety circuit 204 and the PASS power source 206. In some embodiments, the PASS device 200 further includes one or more additional branches 216 electrically connected to the PASS power source 206, and electrically separated from the first branch 208 and the second branch 210. Each additional branch 216 includes an additional circuit 218, and a barrier circuit 220 disposed between the additional circuit 218 and the PASS power source 206. In some embodiments, the additional circuits 218 may include one or more of radio circuits, sensor circuits, etc., used to collect and deliver data to a user (not shown) as an additional feature of the PASS device 200. The first, second and additional barrier circuits 212, 214, 220 may be intrinsic safety barrier circuits. In some embodiments, the first barrier circuit 212, the second barrier circuit 214, and the additional barrier circuits 220 may include one or more of a fuse, a diode, and an electrical resistor.

The PASS device 200 may be vulnerable to thermal damage. The first barrier circuit 212, the second barrier circuit 214, and the barrier circuits 220 may limit the available energy from the PASS power source 206 to the first branch 208, the second branch 210 and the additional branches 216, respectively. Therefore, the first barrier circuit 212, the second barrier circuit 214, and the barrier circuits 220 may prevent the PASS logic circuit 202, the safety circuit 204, and the additional circuits 218, respectively, from detonating in an explosive atmosphere. Specifically, the first barrier circuit 212, the second barrier circuit 214, and the barrier circuits 220 may prevent a spark or a hotspot that may otherwise cause ignition in the explosive atmosphere and subsequently damage the PASS device 200 or expose the PASS device 200 to excessive heat causing loss of one or more of the first branch 208, the second branch 210 and the additional branches 216. The PASS device 200 may also be vulnerable to physical damage.

The safety circuit 204 may be designed in such a manner that the safety circuit 204 has a higher probability of surviving the physical and thermal damage than other components of the PASS device 200. The PASS device 200 of the present disclosure including the safety circuit 204 may ensure that the PASS device 200 generates an alarm when a worker is in danger or distress.

The safety circuit 204 of the PASS device 200 is illustrated in FIG. 3, and explained in detail below.

FIG. 3 is a block diagram of the safety circuit 204 of the PASS device 200 as shown in FIGS. 1 and 2. Referring to FIGS. 1-3, the safety circuit 204 includes a safety logic circuit 302 and an alarm circuit 304 communicably coupled with the safety logic circuit 302. The safety logic circuit 302 is communicably coupled with the PASS device 200. Specifically, the safety logic circuit 302 is communicably coupled to the PASS logic circuit 202 of the PASS device 200. In some embodiments, the safety logic circuit 302 is communicably coupled to the PASS logic circuit 202 via the communication link 203.

The safety logic circuit 302 has at least an off state and an on state. In some embodiments, the on state and the off state of the safety logic circuit 302 may correspond to the on state and the off state of the safety circuit 204.

The safety logic circuit 302 further includes a timer 301. The timer 301 is configured to determine a time elapsed since the timer 301 has been last reset. The timer 301 may measure time in seconds. A time period measured by the timer 301 is initialized to zero upon each reset. The timer 301 may then resume determining a time elapsed since the last reset.

The safety logic circuit 302 is configured to switch from the off state to the on state upon receiving the activation signal from the PASS device 200. Specifically, the safety logic circuit 302 is configured to switch from the off state to the on state upon receiving the activation signal from the PASS logic circuit 202 of the PASS device 200. The safety logic circuit 302 is further configured to reset the timer 301 upon switching to the on state. In some cases, the activation signal may correspond to a logical high state (i.e., 1).

The safety logic circuit 302 is further configured to generate a trigger signal in response to the timer 301 exceeding a time threshold. In some embodiments, the time threshold may be at least 10 seconds, at least 20 seconds, at least 30 seconds, at least 40 seconds, at least 50 seconds, or at least 60 seconds. In some embodiments, the time threshold may be pre-defined. In some embodiments, the time threshold may be user-defined. In some embodiments, the time threshold may be equal to a period of the reset signal from the PASS device 200. In some embodiments, the time threshold may be more than the period of the reset signal from the PASS device 200. In some embodiments, the time threshold may be compliant with the requirements of National Fire Protection Association (NFPA) and/or other international standards. In some embodiments, the safety logic circuit 302 may include a signal generator 303 to generate the trigger signal in response to the timer 301 exceeding the time threshold.

The safety logic circuit 302 is further configured to reset the timer 301 upon receiving the reset signal from the PASS logic circuit 202 before the timer 301 exceeds the time threshold. In other words, the safety logic circuit 302 is configured to dismiss the trigger signal and reset the timer 301 upon receiving the reset signal from the PASS logic circuit 202 before the timer 301 exceeds the time threshold. In other words, the safety logic circuit 302 may not transmit the trigger signal if the reset signal from the PASS logic circuit 202 is received before the timer 301 exceeds the time threshold. Further, the safety logic circuit 302 resets the timer 301 to zero upon receiving the reset signal before the timer 301 exceeds the time threshold.

As mentioned above, the PASS logic circuit 202 periodically generates the reset signal in the PASS on state. In normal working condition of the PASS device 200, the reset signal from the PASS device 200 resets the timer 301 before the timer 301 exceeds the time threshold.

The PASS device 200 may be vulnerable to thermal and/or physical damage during use. In case the PASS device 200 undergoes thermal and/or physical damage, the PASS logic circuit 202 of the PASS device 200 may not be able to generate the reset signal. Consequently, the safety logic circuit 302 may not reset the timer 301 before the timer 301 exceeds the time threshold. Therefore, in this case, the timer 301 exceeds the time threshold and subsequently the safety logic circuit 302 generates the trigger signal.

The alarm circuit 304 is configured to generate an alarm signal upon receiving the trigger signal from the safety logic circuit 302. The trigger signal may be any signal that actuates the alarm circuit 304 to generate the alarm signal. In some embodiments, the safety circuit 204 further includes an alarm element 310 communicably coupled to the alarm circuit 304. The alarm element 310 is configured to generate an alarm upon receiving the alarm signal from the alarm circuit 304. The alarm signal may be any signal that actuates the alarm element 310 to generate the alarm. In some embodiments, the alarm element 310 is at least one of a piezoelectric element and an optical element. The piezoelectric element may generate an audible and/or haptic alert. The optical element may generate a visual alert. In some embodiments, the optical element may include notification LEDs and notification displays.

In some embodiments, the safety circuit 204 further includes a circuit power source 306 communicably coupled to the safety logic circuit 302 and the alarm circuit 304. In some embodiments, the circuit power source 306 may include electrochemical cells, batteries, battery packs, portable power stations or portable power supplies. In some embodiments, the circuit power source 306 may include replaceable or rechargeable batteries.

Referring to FIGS. 2 and 3, the safety logic circuit 302 and the alarm circuit 304 are further communicably coupled to the PASS power source 206 associated with the PASS device 200. In some embodiments, the safety circuit 204 further includes a power management circuit 308 communicably coupled to the safety logic circuit 302, the alarm circuit 304, the PASS power source 206, and the circuit power source 306. In some embodiments, the power management circuit 308 is communicably coupled to the PASS power source 206 via the second branch 210. In some embodiments, the power management circuit 308 is configured to provide power to the safety logic circuit 302 and the alarm circuit 304 from at least one of the PASS power source 206 and the circuit power source 306. In some embodiments, the power management circuit 308 is further configured to normally provide power to the safety logic circuit 302 and the alarm circuit 304 from the PASS power source 206. In other words, during normal operation of the PASS device 200, the safety logic circuit 302 and the alarm circuit 304 may receive power from the PASS power source 206.

In some embodiments, the safety logic circuit 302 is further configured to switch from the on state to the off state upon receiving the deactivation signal from the PASS device 200. Specifically, the safety logic circuit 302 may be configured to switch from the on state to the off state upon receiving the deactivation signal from the PASS logic circuit 202. In other words, when the safety logic circuit 302 receives the deactivation signal from the PASS device 200, the safety logic circuit 302 switches to the off state and may remain in the off state until the safety logic circuit 302 receives the activation signal from the PASS device 200. In some cases, the deactivation signal may correspond to a logical low state (i.e., 0). In the off state, the safety logic circuit 302 may remain dormant and does not perform any emergency detection functions, such as detecting the reset signal and generating the trigger signal. The safety logic circuit 302 can perform such emergency detection functions in the on state.

In some embodiments, the safety logic circuit 302 is further configured to determine a loss of power from the PASS power source 206. In some embodiments, the safety logic circuit 302 is configured to determine, via the power management circuit 308, the loss of power from the PASS power source 206. The loss of power may be due to physical and/or thermal damage to the PASS device 200. In some cases, the loss of power may be due to physical and/or thermal damage to the PASS power source 206 of the PASS device 200. In some cases, the loss of power may be due to a low battery condition of the PASS power source 206. In some other cases, the loss of power may be due to removal of the PASS power source 206 from the PASS device 200. In such cases, the safety logic circuit 302 and the alarm circuit 304 receive power from the circuit power source 306 at least during the loss of power from the PASS power source 206.

In some embodiments, the power management circuit 308 is further configured to provide power to the safety logic circuit 302 and the alarm circuit 304 from the circuit power source 306 upon the loss of power from the PASS power source 206. The power management circuit 308 may include suitable circuitry to detect loss of power from one or more power sources and switch between multiple power sources, i.e., the PASS power source 206 and the circuit power source 306.

In some embodiments, the safety logic circuit 302 is configured to generate the trigger signal upon determining the loss of power from the PASS power source 206 prior to receiving the deactivation signal from the PASS device 200. For example, the PASS device 200 may be unable to transmit the deactivation signal due to damage or malfunction. The PASS power source 206 may further be unable to supply power due to physical and/or thermal damage to the PASS power source 206 or the PASS device 200, the low battery condition, or removal of the PASS power source 206 from the PASS device 200. In such a situation, the safety logic circuit 302 may generate the trigger signal indicative of an alert condition.

In some embodiments, the PASS logic circuit 202 is further configured to generate an emergency signal indicative of an emergency state of the PASS device 200. In some embodiments, the emergency state of the PASS device 200 is determined automatically by one or more sensors (not shown) communicably coupled with the PASS logic circuit 202 of the PASS device 200. In some embodiments, the PASS device 200 may include motion sensors which may detect the motion of the emergency worker corresponding to the PASS device 200. In some embodiments, the PASS logic circuit 202 of the PASS device 200 may generate the emergency signal when the motion of the emergency worker stops for at least a predetermined time period, for example, at least 10 seconds, at least 20 seconds, at least 30 seconds, at least 40 seconds, at least 50 seconds, or at least 60 seconds. In some embodiments, the PASS device 200 may include pressure sensors which may detect air pressure in the air tank 102 (shown in FIG. 1). In some embodiments, the PASS logic circuit 202 of the PASS device 200 may generate the emergency signal when the amount of air remaining in the air tank 102 falls below a required level. In some other embodiments, the PASS device 200 may include other sensors, such as temperature sensors, to automatically determine the emergency state of the PASS device 200.

In some embodiments, the emergency signal may be initiated manually by a worker in the emergency state. In some embodiments, the PASS device 200 may include a switch/button (not shown) to generate the emergency signal indicative of the emergency state of the PASS device 200. Upon activation of the button by the worker, the PASS logic circuit 202 of the PASS device 200 generates the emergency signal.

In some embodiments, the safety logic circuit 302 is further configured to generate the trigger signal upon receiving the emergency signal from the PASS device 200. Specifically, the safety logic circuit 302 is further configured to generate the trigger signal upon receiving the emergency signal from the PASS logic circuit 202. The alarm circuit 304 is configured to generate the alarm signal upon receiving the trigger signal from the safety logic circuit 302 and subsequently, the alarm element 310 generates the alarm upon receiving the alarm signal from the alarm circuit 304.

FIG. 4 shows a logic table 400 illustrating possible outcomes by the PASS device 200 (shown in FIG. 2) including the safety circuit 204. The logic table 400 includes multiple column headings in a row 418. The column headings in the row 418 include "PASS Device" at a column 402, "Safety Circuit" at a column 404, "PASS Power Source" at a column 406, "Circuit Power Source" at a column 408, "PASS Logic Circuit" at a column 410, "Timer" at a column 412, "Safety Logic Circuit" at a column 414, and "Alarm" at a column 416.

Now referring to FIGS. 2-4, the column 402 indicates the PASS on and the PASS off states of the PASS device 200. The column 404 indicates the on state and the off state of the safety logic circuit 302 or the safety circuit 204 corresponding to the PASS on and the PASS off states of the PASS device 200. The column 406 indicates an "in use" or ON and a "not in use" or OFF states of the PASS power source 206. The column 408 indicates an "in use" or ON and a "not in use" or OFF states of the circuit power source 306. The column 410 indicates various signals transmitted by the PASS logic circuit 202 to the safety logic circuit 302. The column 412 indicates responses of the timer 301 corresponding to the signals transmitted by the PASS logic circuit 202 to the safety logic circuit 302. The column 414 indicates responses of the safety logic circuit 302 corresponding to the columns 402, 404, 406, 408, 410, 412. The column 416 indicates if the alarm is generated.

According to the logic table 400, the PASS device 200, including the safety circuit 204 of the present disclosure, may generally operate in five conditions. Specifically, the PASS device 200 including the safety circuit 204 may operate in a dormant condition, a normal condition, a PASS damage condition, an emergency condition, and a power loss condition. In some embodiments, the PASS device 200 including the safety circuit 204 may operate in other conditions. The dormant condition is shown in a row 420. The normal condition is shown in a row 422. The PASS damage condition is shown in a row 424. The emergency condition is shown in a row 426. The power loss condition is shown in a row 428.

In the dormant condition shown in the row 420, the PASS device 200 is off. In this condition, the PASS device 200 is not in use. Therefore, the PASS logic circuit 202 of the PASS device 200 is in the PASS off state or a dormant state. Subsequently, the safety logic circuit 302 of the safety circuit 204 is also in the off state or the dormant state and waiting for the activation signal from the PASS device 200 to switch from the off state to the on state. In some embodiments, the safety logic circuit 302 of the safety circuit 204 switches to the off state upon receiving the deactivation signal from the PASS logic circuit 202. The PASS logic circuit 202 generates the deactivation signal upon switching from the PASS on state to the PASS off state. The safety logic circuit 302 of the safety circuit 204 switches from the on state to the off state only upon receiving the deactivation signal from the PASS logic circuit 202. Since the PASS device 200 is off, the PASS power source 206 is in the "not in use" or OFF state. Subsequently, the circuit power source 306 is also in the "not in use" or OFF state. Consequently, the PASS logic circuit 202 and the safety logic circuit 302 do not generate any signal. Thus, the alarm is not generated in the dormant condition.

In the normal condition shown in the row 422, the PASS logic circuit 202 of the PASS device 200 is in the PASS on state. In this condition, the PASS device 200 is in use. Upon activation, the PASS logic circuit 202 generates the activation signal upon switching from the PASS off state to the PASS on state. The safety logic circuit 302 of the safety circuit 204 switches from the off state to the on state upon receiving the activation signal from the PASS logic circuit 202. The safety logic circuit 302 further resets the timer 301 upon receiving the activation signal from the PASS logic circuit 202. The timer 301 is activated and starts counting or determining a time elapsed since the last reset. The power management circuit 308 normally provides power to the safety logic circuit 302 and the alarm circuit 304 from the PASS power source 206. Therefore, the PASS power source 206 is in the "in use" or ON state. Subsequently, the circuit power source 306 is in the "not in use" or OFF state. The PASS logic circuit 202 periodically generates the reset signal. The safety logic circuit 302 resets the timer 301 upon receiving the reset signal from the PASS logic circuit 202. Therefore, the safety logic circuit 302 does not generate the trigger signal. Thus, the alarm is not generated in the normal condition.

In the PASS damage condition shown in the row 424, the PASS device 200 or the PASS logic circuit 202 may be damaged due to any physical and/or thermal damage while in use by the worker in the hazardous environment. In the PASS damage condition, the PASS logic circuit 202 of the PASS device 200 is in the PASS on state. The safety logic circuit 302 of the safety circuit 204 is also in the on state. Since the power management circuit 308 normally provides power to the safety logic circuit 302 and the alarm circuit 304 from the PASS power source 206, the PASS power source 206 is in the "in use" or ON state. Subsequently, the circuit power source 306 is in the "not in use" or OFF state. However, due to the physical and/or thermal damage to the PASS device 200, the PASS logic circuit 202 does not generate the reset signal. Subsequently, the safety logic circuit 302 does not reset the timer 301. Therefore, the timer 301 will exceed the time threshold and the safety logic circuit 302 will generate the trigger signal. Upon receiving the receiving the trigger signal from the safety logic circuit 302, the alarm circuit 304 generates the alarm signal which in turn generates the alarm.

In the emergency condition shown in the row 426, the emergency signal is generated by the PASS device 200. The emergency signal may be manually generated by the emergency worker in the emergency condition or may be automatically generated by the PASS logic circuit 202 upon detecting the emergency condition while in use by the worker. In the emergency condition, the PASS logic circuit 202 of the PASS device 200 is in the PASS on state. The safety logic circuit 302 of the safety circuit 204 is in the on state. Since the power management circuit 308 normally provides power to the safety logic circuit 302 and the alarm circuit 304 from the PASS power source 206, the PASS power source 206 is in the "in use" or ON state. Subsequently, the circuit power source 306 is in the "not in use" or OFF state. Upon receiving the emergency signal from the PASS logic circuit 202, the safety logic circuit 302 generates the trigger signal. Upon receiving the trigger signal from the safety logic circuit 302, the alarm circuit 304 generates the alarm signal which in turn generates the alarm.

In the power loss condition shown in the row 428, the PASS logic circuit 202 of the PASS device 200 is in the PASS on state. The safety logic circuit 302 is in the on state. In this condition, the power from the PASS power source 206 is lost prior to receiving the deactivation signal from the PASS device 200. In some embodiments, the power from the PASS power source 206 may be lost due to low power or damage to the PASS power source 206. Upon determining the loss of power from the PASS power source 206, the safety logic circuit 302 generates the trigger signal. In this condition, the power management circuit 308 provides power to the safety logic circuit 302 and the alarm circuit 304 from the circuit power source 306. The power management circuit 308 may include suitable circuitry (for example, one or more switches) to switch from the PASS power source 206 to the circuit power source 306. Therefore, in this condition, the circuit power source 306 is in the "in use" or ON state. Upon receiving the receiving the trigger signal from the safety logic circuit 302, the alarm circuit 304 generates the alarm signal which in turn generates the alarm.

As may be apparent from the logic table 400, the alarm will be generated in each of the PASS damage condition, the emergency condition, and the power loss condition. Thus, the alarm is generated in case the safety logic circuit 302 detects one or more of the PASS damage condition, the emergency condition, and the power loss condition. Each of the PASS damage condition, the emergency condition, and the power loss condition indicates a true emergency and requires an immediate response to rescue the worker in distress. Therefore, the PASS device 200 of the present disclosure including the safety circuit 204 may ensure that the PASS device 200 generates the alarm when the worker is in danger or distress. Further, the alarm is generated even when the PASS device 200 is damaged or there is a loss of power from the PASS power source 206. The second barrier circuit 214 may ensure that the safety circuit 204 is functional even when the PASS device 200 or the PASS logic circuit 202 is damaged.

Referring to FIGS. 2-5, the present disclosure provides a method 500 for use with the PASS device 200.

At step 502, the method 500 includes resetting the timer 301 upon receiving the activation signal from the PASS device 200. The timer 301 is configured to determine the time elapsed since the timer 301 has been last reset. The activation signal is indicative of the switching of the PASS device 200 from the PASS off state to the PASS on state. In some embodiments, the method 500 further includes switching the safety logic circuit 302 from the off state to the on state upon receiving the activation signal from the PASS device 200.

At step 504, the method 500 further includes generating the alarm in response to the timer 301 exceeding the time threshold. In some embodiments, generating the alarm further includes generating, via the safety logic circuit 302, the trigger signal in response to the timer 301 exceeding the time threshold. Further, generating the alarm further includes generating, via the alarm circuit 304, the alarm signal upon receiving the trigger signal from the safety logic circuit 302. In some embodiments, generating the alarm further includes generating, via the alarm element 310, the alarm upon receiving the alarm signal from the alarm circuit 304. In some embodiments, the alarm element 310 includes at least one of the piezoelectric element and the optical element.

At step 506, the method 500 further includes resetting the timer upon receiving the reset signal from the PASS device 200 before the timer exceeds the time threshold.

In some embodiments, the method 500 further includes generating the alarm in response to receiving the emergency signal from the PASS device 200.

In some embodiments, the method 500 further includes generating the alarm in response to determining the loss of power from the PASS power source 206 prior to receiving the deactivation signal from the PASS device 200. The method 500 further includes switching from the PASS power source 206 to the circuit power source 306 upon the loss of power from the PASS power source 206.

Figure 6A:
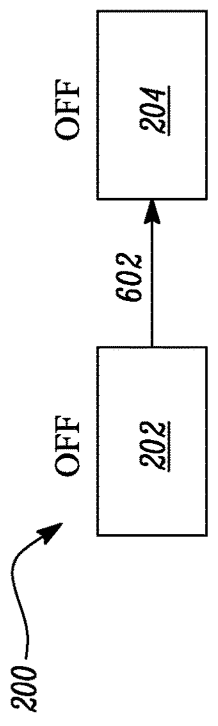
FIGS. 6A-6F illustrate different exemplary conditions of the PASS device.

FIGS. 6A-6F illustrate different states of the PASS device 200. Reference will also be made to FIGS. 2-4. FIG. 6A illustrates the dormant condition of the PASS device 200 corresponding to the row 420 of FIG. 4. The PASS device 200 is in the PASS off state. The safety circuit 204 including the safety logic circuit 302 is also in the off state or the dormant state. In some embodiments, the safety logic circuit 302 of the safety circuit 204 switches to the off state upon receiving a deactivation signal 602 from the PASS logic circuit 202. The PASS logic circuit 202 generates the deactivation signal 602 upon switching from the PASS on state to the PASS off state. The safety logic circuit 302 of the safety circuit 204 switches from the on state to the off state only upon receiving the deactivation signal 602 from the PASS logic circuit 202. Since the PASS device 200 is off, the PASS power source 206 is in the "not in use" or OFF state. Subsequently, the circuit power source 306 is also in the "not in use" or OFF state. Consequently, the PASS logic circuit 202 and the safety logic circuit 302 do not generate any signal. Thus, the alarm is not generated in the dormant condition.

Figure 6B:
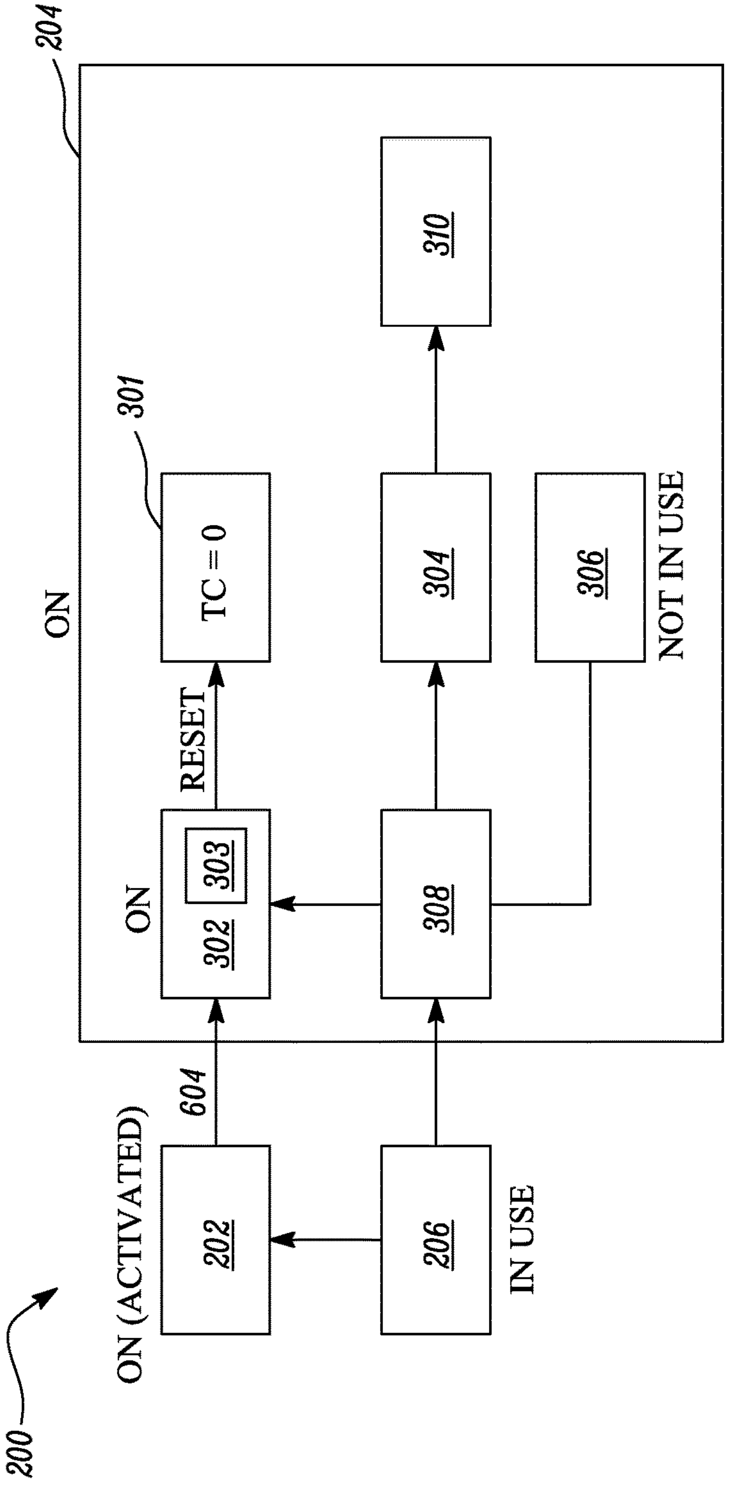

FIG. 6B illustrates an activated condition of the PASS device 200. In the activated condition, the PASS logic circuit 202 of the PASS device 200 switches to the PASS on state. In this condition, the PASS device 200 is in use. Upon activation, the PASS logic circuit 202 generates an activation signal 604 upon switching from the PASS off state to the PASS on state. The safety logic circuit 302 of the safety circuit 204 switches from the off state to the on state upon receiving the activation signal 604 from the PASS logic circuit 202. The safety logic circuit 302 further resets the timer 301 upon receiving the activation signal 604 from the PASS logic circuit 202. The safety logic circuit 302 may use an appropriate signal to reset the timer 301. A timer count TC of the timer 301 is reset to 0 (TC=0) when the timer 301 is reset by the safety logic circuit 302. The timer 301 is activated and starts counting or determining a time elapsed since the last reset. The PASS logic circuit 202 is powered by the PASS power source 206. Further, the power management circuit 308 normally provides power to the safety logic circuit 302 and the alarm circuit 304 from the PASS power source 206. Therefore, the PASS power source 206 is in the "in use" or ON state. Subsequently, the circuit power source 306 is in the "not in use" or OFF state.

Figure 6C:
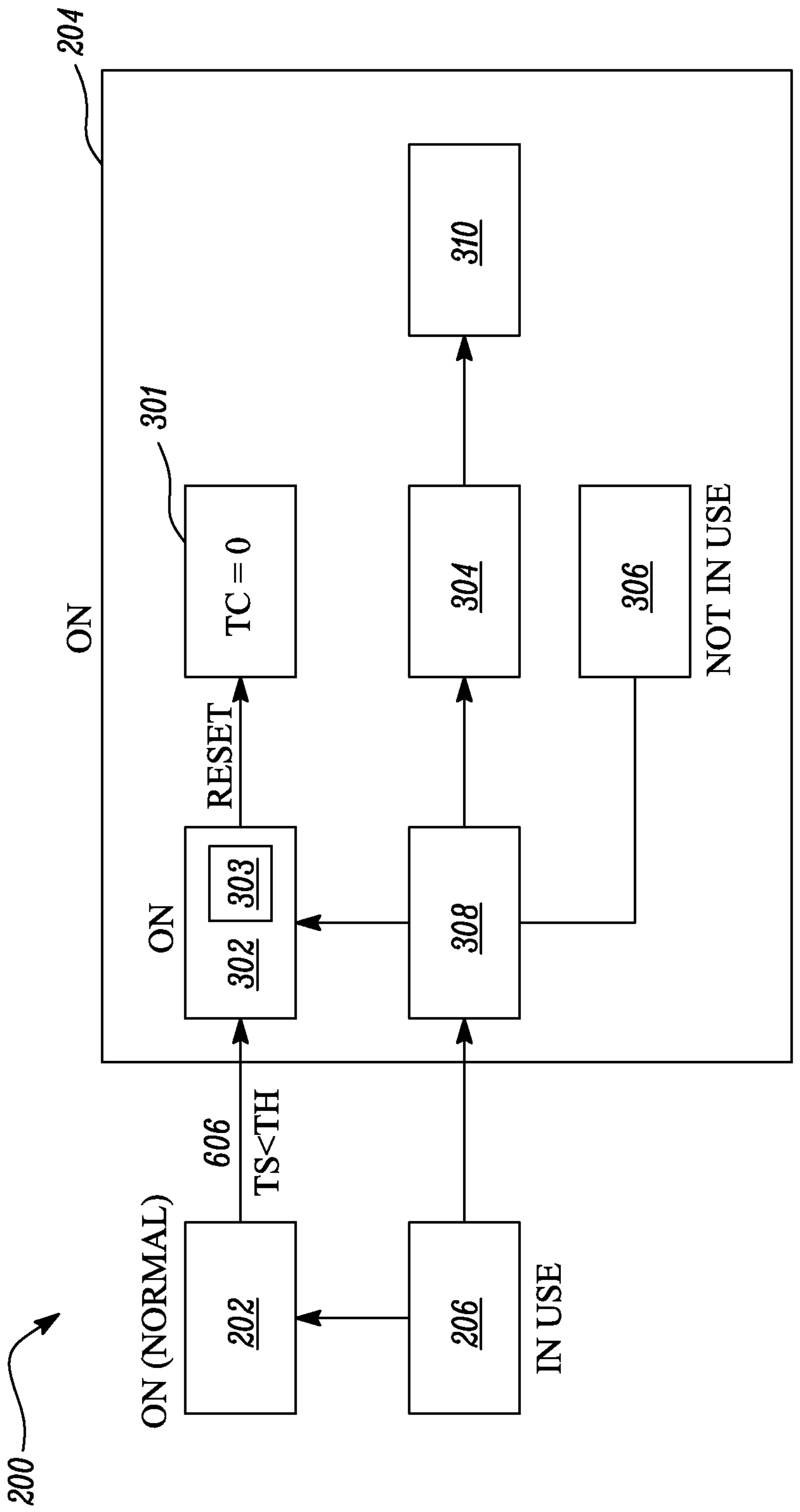

FIG. 6C illustrates the normal condition of the PASS device 200 corresponding to the row 422 of FIG. 4. In the normal condition, the PASS logic circuit 202 of the PASS device 200 is in the PASS on state. The PASS logic circuit 202 periodically generates a reset signal 606. The safety logic circuit 302 resets the timer 301 upon receiving the reset signal 606 from the PASS logic circuit 202. The PASS logic circuit 202 may periodically generate the reset signal 606 after a time period TS. The time period TS is less than a time threshold TH (i.e., TS<TH). In some embodiments, the time period TS may be at most 10%, at most 20%, at most 30%, at most 40%, at most 50%, at most 60% or at most 70% of the time threshold TH. The alarm is generated if the timer count TC exceeds the time threshold TH (i.e., TC>TH). Consequently, the timer count TC does not exceed the time threshold TH during the normal condition of the PASS device 200. In other words, the time count TC is less than or equal to the time threshold TH (i.e., TC≤TH) during the normal condition of the PASS device 200. Therefore, the safety logic circuit 302 does not generate the trigger signal. Thus, the alarm is not generated in the normal condition.

Figure 6D:
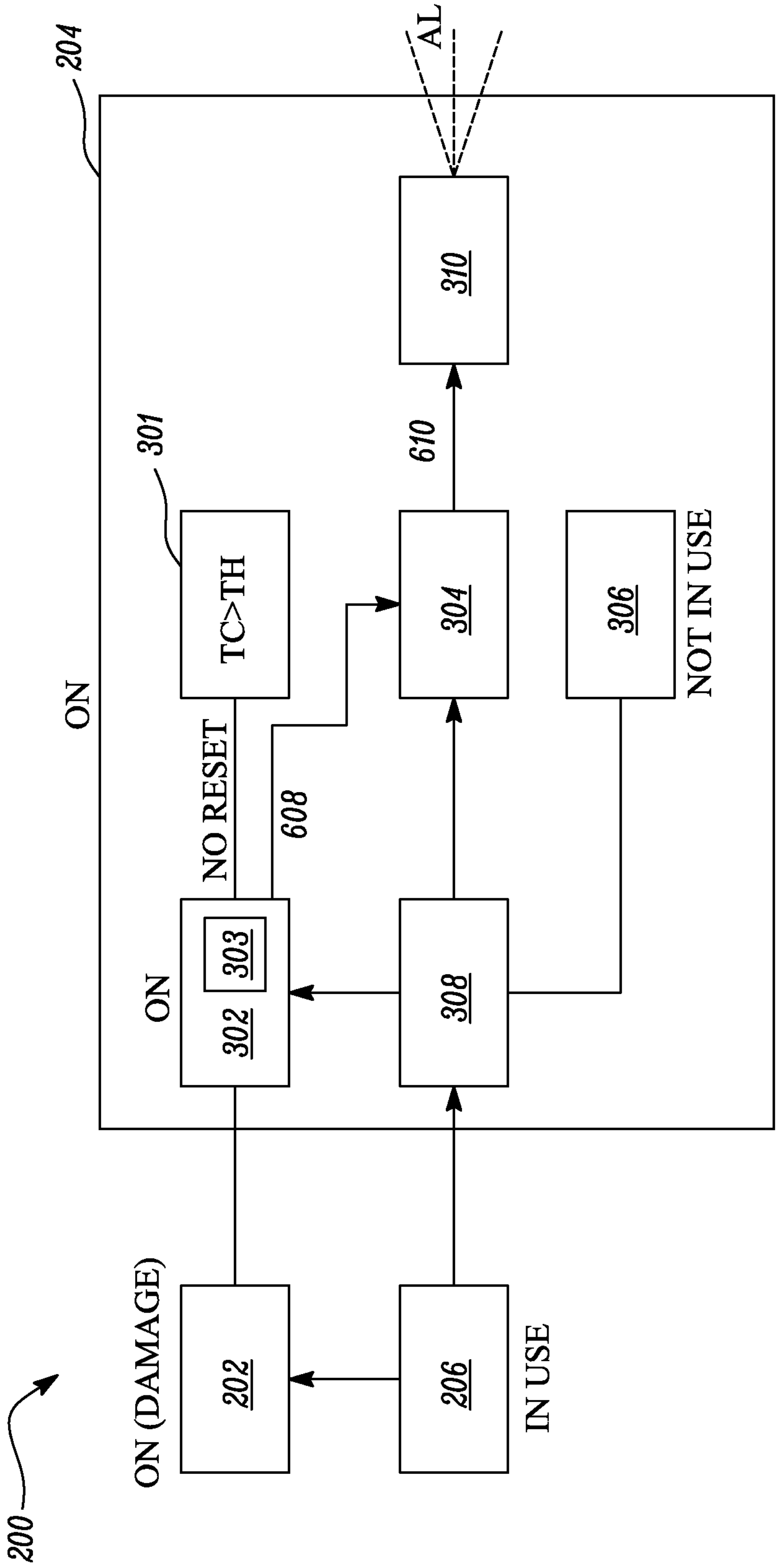

FIG. 6D illustrates the PASS damage condition of the PASS device 200 corresponding to the row 424 of FIG. 4. In the PASS damage condition, the PASS device 200 or the PASS logic circuit 202 may be damaged due to any physical and/or thermal damage while in use by the worker in the hazardous environment. In the PASS damage condition, the PASS logic circuit 202 of the PASS device 200 is in the PASS on state. The safety logic circuit 302 of the safety circuit 204 is also in the on state. Since the power management circuit 308 normally provides power to the safety logic circuit 302 and the alarm circuit 304 from the PASS power source 206, the PASS power source 206 is in the "in use" or ON state. Subsequently, the circuit power source 306 is in the "not in use" or OFF state. However, due to the physical and/or thermal damage to the PASS device 200, the PASS logic circuit 202 does not generate the reset signal. Subsequently, the safety logic circuit 302 does not reset the timer 301. Therefore, the timer 301 will exceed the time threshold and the safety logic circuit 302 will generate a trigger signal 608. Specifically, due to the absence of the reset signal 606, the timer count TC exceeds the time threshold TH (i.e., TC>TH). Further, the safety logic circuit 302 generates the trigger signal 608 in response to the timer count TC exceeding the time threshold TH. The safety logic circuit 302 may use the signal generator 303 to generate the trigger signal 608. Upon receiving the receiving the trigger signal 608 from the safety logic circuit 302, the alarm circuit 304 generates an alarm signal 610. The alarm element 310 generates an alarm AL upon receiving the alarm signal 610 from the alarm circuit 304. Therefore, the alarm AL is generated in the PASS damage condition.

Figure 6E:
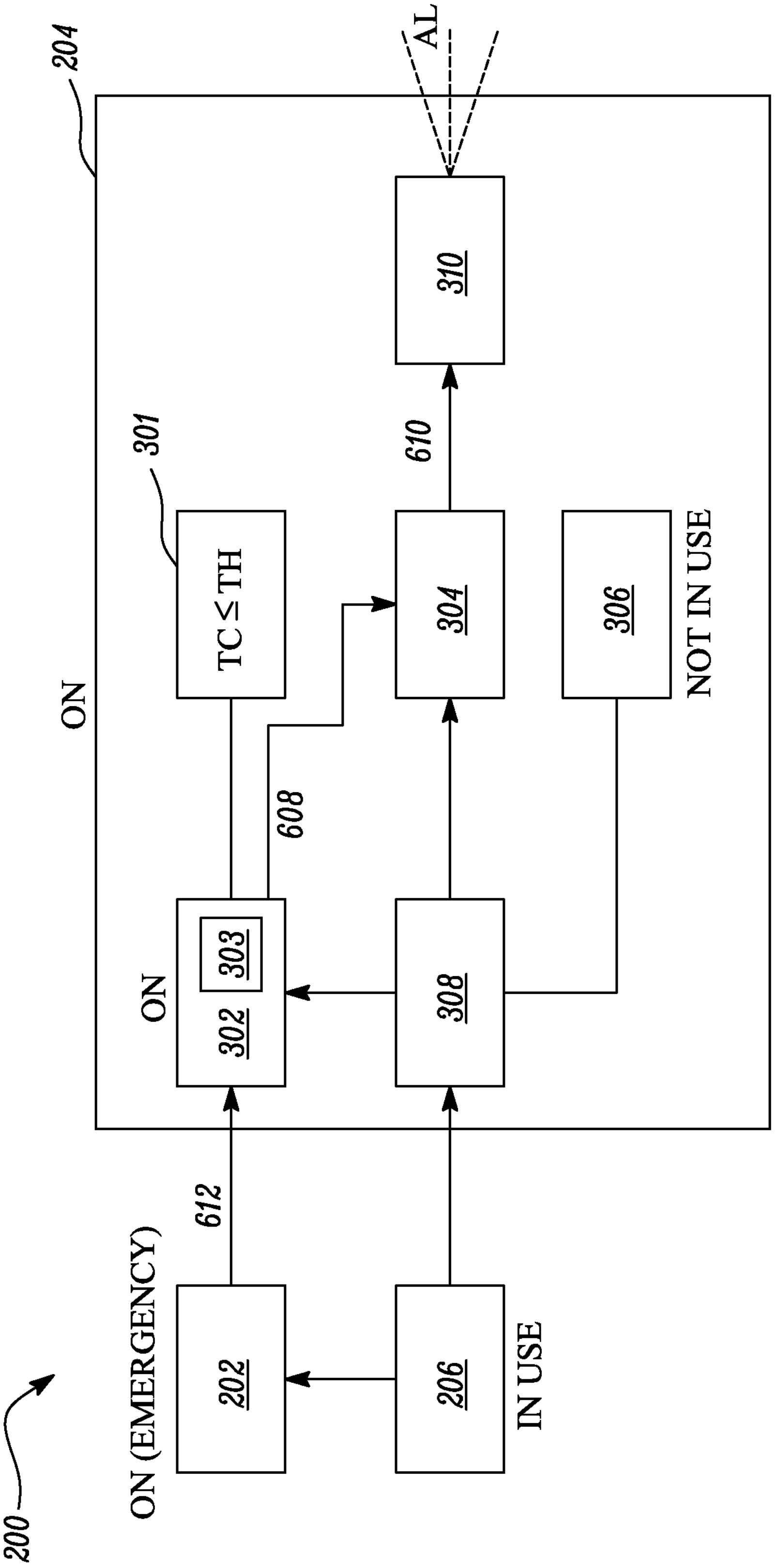

FIG. 6E illustrates the emergency condition of the PASS device 200 corresponding to the row 426 of FIG. 4. In the emergency condition, the PASS device 200 generates an emergency signal 612. The emergency signal 612 may be manually generated by the emergency worker in the emergency condition or may be automatically generated by the PASS logic circuit 202 upon detecting the emergency condition while in use by the worker. In the emergency condition, the PASS logic circuit 202 of the PASS device 200 is in the PASS on state. The safety logic circuit 302 of the safety circuit 204 is in the on state. Since the power management circuit 308 normally provides power to the safety logic circuit 302 and the alarm circuit 304 from the PASS power source 206, the PASS power source 206 is in the "in use" or ON state. Subsequently, the circuit power source 306 is in the "not in use" or OFF state. Upon receiving the emergency signal 612 from the PASS logic circuit 202, the safety logic circuit 302 generates the trigger signal 608. Upon receiving the receiving the trigger signal 608 from the safety logic circuit 302, the alarm circuit 304 generates the alarm signal 610. The alarm element 310 generates the alarm AL upon receiving the alarm signal 610 from the alarm circuit 304. Therefore, the alarm AL is generated in the emergency condition even when the timer count TC has not exceeded the time threshold TH (i.e., TC≤TH).

Figure 6F:
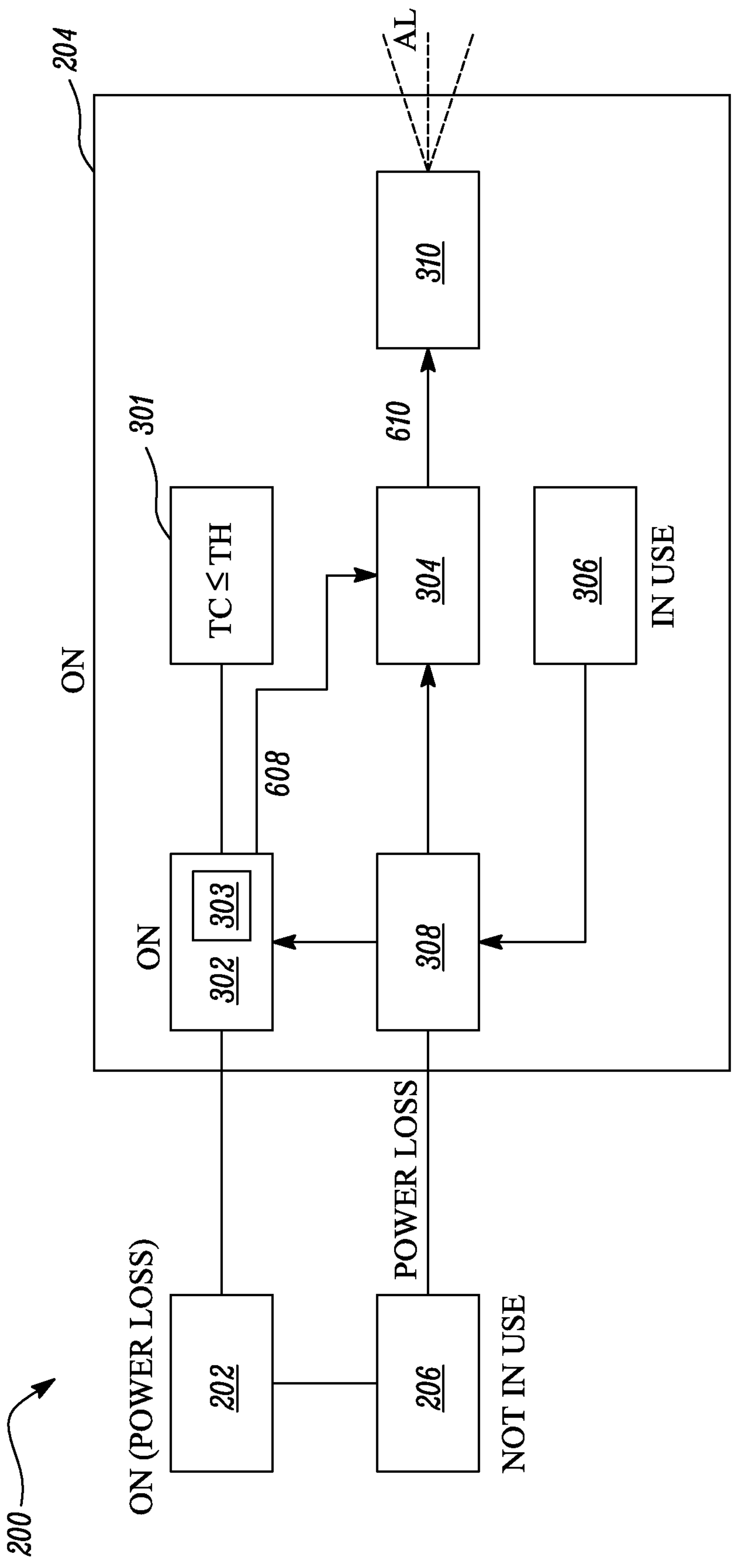

FIG. 6F illustrates the power loss condition of the PASS device 200 corresponding to the row 428 of FIG. 4. In the power loss condition, the PASS logic circuit 202 of the PASS device 200 is in the PASS on state. The safety logic circuit 302 is in the on state. In this condition, the power from the PASS power source 206 is lost prior to receiving the deactivation signal from the PASS device 200. In some embodiments, the power from the PASS power source 206 may be lost due to low power or damage to the PASS power source 206. Upon determining the loss of power from the PASS power source 206, the safety logic circuit 302 generates the trigger signal 608. In this condition, the power management circuit 308 provides power to the safety logic circuit 302 and the alarm circuit 304 from the circuit power source 306. The power management circuit 308 may include suitable circuitry (for example, one or more switches) to switch from the PASS power source 206 to the circuit power source 306. Therefore, in this condition, the circuit power source 306 is in the "in use" or ON state. Upon receiving the receiving the trigger signal 608 from the safety logic circuit 302, the alarm circuit 304 generates the alarm signal 610. The alarm element 310 generates the alarm AL upon receiving the alarm signal 610 from the alarm circuit 304. Therefore, the alarm AL is generated in the power loss condition even when the timer count TC has not exceeded the time threshold TH (i.e., $TC \leq TH$).

In some situations, the power loss condition and the PASS damage condition may occur simultaneously due to damage to both the PASS logic circuit 202 and the PASS power source 206. The alarm AL is generated in such situations.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A safety circuit for a Personal Alert Safety System (PASS) device, the safety circuit comprising:

a safety logic circuit communicably coupled to the PASS device, the safety logic circuit having at least an off state and an on state, the safety logic circuit comprising a timer configured to determine a time elapsed since the timer has been last reset, the safety logic circuit being configured to operate at least in a normal condition and a damage condition, the safety logic circuit configured to:

switch from the off state to the on state upon receiving an activation signal from the PASS device, wherein the activation signal is indicative of the switching of the PASS device from a PASS off state to a PASS on state;

reset the timer upon switching to the on state;

generate a trigger signal in response to the timer exceeding a time threshold in the damage condition, wherein the damage condition corresponds to a physical or a thermal damage of the PASS device; and reset the timer upon receiving a reset signal from the PASS device before the timer exceeds the time threshold in the normal condition; and an alarm circuit communicably coupled to the safety logic circuit, wherein the alarm circuit is configured to generate an alarm signal upon receiving the trigger signal from the safety logic circuit.

2. The safety circuit of claim 1, wherein the safety logic circuit is further configured to generate the trigger signal upon receiving an emergency signal from the PASS device.

3. The safety circuit of claim 1, wherein the safety logic circuit is further configured to switch from the on state to the off state upon receiving a deactivation signal from the PASS device, and wherein the deactivation signal is indicative of the switching of the PASS device from the PASS on state to the PASS off state.

4. The safety circuit of claim 3, wherein the safety logic circuit and the alarm circuit are further communicably coupled to a PASS power source associated with the PASS device, and wherein the safety logic circuit is further configured to generate the trigger signal upon determining a loss of power from the PASS power source prior to receiving the deactivation signal from the PASS device.

5. The safety circuit of claim 4, further comprising a circuit power source communicably coupled to the safety logic circuit and the alarm circuit, wherein the safety logic circuit and the alarm circuit receives power from the circuit power source at least during the loss of power from the PASS power source.

6. The safety circuit of claim 5, further comprising a power management circuit communicably coupled to the safety logic circuit, the alarm circuit, the PASS power source and the circuit power source, wherein the power management circuit is configured to provide power to the safety logic circuit and the alarm circuit from at least one of the PASS power source and the circuit power source.

7. The safety circuit of claim 1, further comprising an alarm element communicably coupled to the alarm circuit, wherein the alarm element is configured to generate an alarm upon receiving the alarm signal from the alarm circuit.

8. A Personal Alert Safety System (PASS) device, the PASS device comprising:

a PASS logic circuit having at least a PASS on state and a PASS off state, the PASS logic circuit configured to:

generate an activation signal upon switching from the PASS off state to the PASS on state; and generate periodically a reset signal in the PASS on state; and a safety circuit comprising:

a safety logic circuit communicably coupled to the PASS logic circuit, the safety logic circuit having at least an off state and an on state, the safety logic circuit comprising a timer configured to determine a time elapsed since the timer has been last reset, the safety logic circuit being configured to operate at least in a normal condition and a damage condition, the safety logic circuit configured to:

switch from the off state to the on state upon receiving the activation signal from the PASS logic circuit;

reset the timer upon switching to the on state;

generate a trigger signal in response to the timer exceeding a time threshold in the damage condition, wherein the damage condition corresponds to a physical or a thermal damage of the PASS device or the PASS logic circuit; and dismiss the trigger signal and reset the timer upon receiving the reset signal from the PASS logic circuit before the timer exceeds the time threshold in the normal condition; and an alarm circuit communicably coupled to the safety logic circuit, wherein the alarm circuit is configured to generate an alarm signal upon receiving the trigger signal from the safety logic circuit.

9. The PASS device of claim 8, wherein the PASS logic circuit is further configured to generate an emergency signal indicative of an emergency state of the PASS device, and wherein the safety logic circuit is further configured to generate the trigger signal upon receiving the emergency signal from the PASS logic circuit.

10. The PASS device of claim 8, wherein the PASS logic circuit is further configured to generate a deactivation signal upon switching from the PASS on state to the PASS off state, and wherein the safety logic circuit is further configured to switch from the on state to the off state upon receiving the deactivation signal from the PASS logic circuit.

11. The PASS device of claim 10, further comprising a PASS power source communicably coupled to the PASS logic circuit, the safety logic circuit, and the alarm circuit, and wherein the safety logic circuit is further configured to generate the trigger signal upon determining a loss of power from the PASS power source prior to receiving the deactivation signal from the PASS device.

12. The PASS device of claim 11, wherein the safety circuit further comprises a circuit power source communicably coupled to the safety logic circuit and the alarm circuit, wherein the safety logic circuit and the alarm circuit receive power from the circuit power source at least during the loss of power from the PASS power source.

13. The PASS device of claim 12, wherein the safety circuit further comprises a power management circuit communicably coupled to the safety logic circuit, the alarm circuit, the PASS power source and the circuit power source, wherein the power management circuit is configured to provide power to the safety logic circuit and the alarm circuit from at least one of the PASS power source and the circuit power source.

14. The PASS device of claim 11, further comprising a first branch electrically connected to the PASS power source, the first branch comprising the PASS logic circuit and a first barrier circuit disposed between the PASS logic circuit and the PASS power source.

15. The PASS device of claim 8, wherein the safety circuit further comprises an alarm element communicably coupled to the alarm circuit, wherein the alarm element is configured to generate an alarm upon receiving the alarm signal from the alarm circuit.

16. A method for use with a Personal Alert Safety System (PASS) device, the method comprising:

resetting a timer upon receiving an activation signal from the PASS device, wherein the timer is configured to determine a time elapsed since the timer has been last reset, and wherein the activation signal is indicative of the switching of the PASS device from a PASS off state to a PASS on state;

generating an alarm in response to the timer exceeding a time threshold in a damage condition, wherein the damage condition corresponds to a physical or a thermal damage of the PASS device; and resetting the timer upon receiving a reset signal from the PASS device before the timer exceeds the time threshold in a normal condition.

17. The method of claim 16, further comprising switching a safety logic circuit from an off state to an on state upon receiving the activation signal from the PASS device, the safety logic circuit comprising the timer.

18. The method of claim 17, wherein generating the alarm further comprises:

generating, via the safety logic circuit, a trigger signal in response to the timer exceeding the time threshold;

generating, via an alarm circuit, an alarm signal upon receiving the trigger signal from the safety logic circuit; and generating, via an alarm element, the alarm upon receiving the alarm signal from the alarm circuit.

19. The method of claim 16, further comprising generating the alarm in response to receiving an emergency signal from the PASS device.

20. The method of claim 16, further comprising generating the alarm in response to determining a loss of power from a PASS power source prior to receiving a deactivation signal from the PASS device, wherein the deactivation signal is indicative of the switching of the PASS device from the PASS on state to the PASS off state.

* * * * *